United States Patent Office 3,244,955
Patented Apr. 5, 1966

3,244,955
PLURAL MOTOR TAPE DRIVE INCLUDING INFORMATION SEARCHING AND TENSION CONTROL
Frederick James Leslie Turner, Royston Geoffrey Moore, John Marshall, and Patrick Richard Morrison, Croydon, England, assignors to Creed & Company Limited, Croydon, England, a company of Great Britain
Filed July 18, 1962, Ser. No. 210,670
Claims priority, application Great Britain, July 27, 1961, 27,288/61
7 Claims. (Cl. 318—7)

This invention relates to tape information storage apparatus.

Tape is a very suitable medium on which information can be stored and from which such stored information can be withdrawn. It is frequently convenient to provide a tape which is divided into sections which are arranged in sequence along the length of the tape, each one of which sections is allocated to a specific item or series of items of information. Such tape is fed from one reel to another until a particular desired section is reached, whereupon information may be stored in or withdrawn from the selected section.

In previous arrangements for winding tape from one reel to another, somewhat complicated apparatus has very often been provided for sensing the diameter of the tape on each reel, and for controlling the speeds of rotation of the reels to ensure that tape is fed from one reel to the other reel at a constant rate.

The present invention provides an arrangement by which easy access to a particular section of the tape may be obtained. In the preferred embodiment of the invention which will be described, this access is obtained comparatively quickly with apparatus which is adaptable for use with a variety of types of tape reader.

According to the present invention, tape information storage apparatus is provided including means for feeding, from one reel to another, tape having a plurality of sections; means for detecting a selected section; and means operative on detection of the selected section to cause said tape to be fed in a reverse direction to permit information to be stored in or withdrawn from the selected section.

An embodiment of the present invention is now to be described with reference to the accompanying drawings in which.

Figure 1:
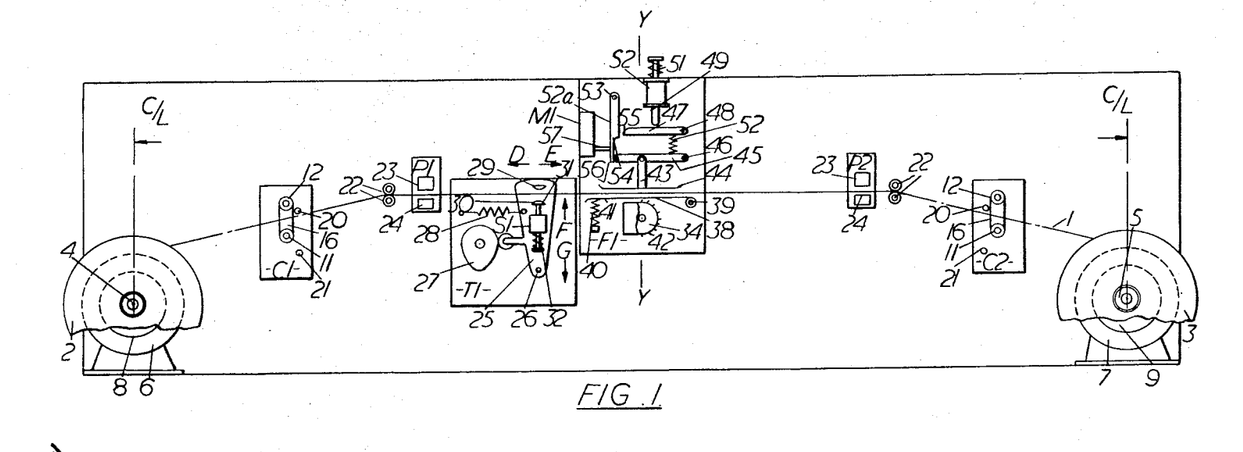
FIG. 1 shows a side view of the tape information storage apparatus.

In the embodiment of the apparatus of FIG. 1, the tape 1 is divided into two halves, each half having 400 separate sections with a small amount of blank tape between sections and a somewhat larger amount of blank tape between the sections of the halves. Each of the 400 sections is particular to a specific item or number of items of information. In the rest condition of the apparatus, one half of the tape is disposed to the left of the line Y—Y and the other half to the right of the line. Throughout the length of the tape there are arranged, side by side, eight perforation channels of which the first, second, third, fifth, sixth and seventh are particular to the elements of a six element telegraph code. Complementary perforations in these channels which extend across the tape are particular to the elements of a character, figure, or symbol of the code, and representative of a "bit" of information of a particular section of tape. The perforations of the fourth and eighth channels, which extend along the channels at regular intervals constitute respectively, feed hole perforations by which means the tape is fed through a tape reading unit F1, and perforations by which the sections of the tape may be counted in its passage between tape reels 2 and 3 on which the tape is accommodated.

Each of the perforations in the eighth channel is disposed mid-way along the section of tape to which it is particular, and it is so arranged that when such a perforation is beneath the photo-reader P1 or the photo-reader P2, the small amount of blank tape between sections is disposed above the centre line of the peckers of a perforated tape reader included in a tape feed unit. Such peckers are shown at 37 in FIG. 4.

The tape reels 2 and 3 accommodating the tape 1 are carried respectively on the shafts 4 and 5 of D.C. electric motors 6 and 7. Each of the motors incorporates an electro-magnetic brake such as brake 8 for motor 6 and brake 9 for motor 7. The motors are arranged to be independently driven in such manner that whilst one is driving to draw tape from the reel associated with the other, the other is acting as a brake; and if the driving motor is switched off, both are arranged to act as their own brakes to reduce the rotational speed of the reels prior to application of the electro-magnetic brakes 8 and 9. After application of the electro-magnetic brakes, one motor is arranged to drive its reel at a relatively low speed to take up slack tape accruing between reels due to the feeding of the tape by a sprocket-wheel of the tape feed unit F1 when information is to be read from a selected section or sections of tape.

Figure 2:
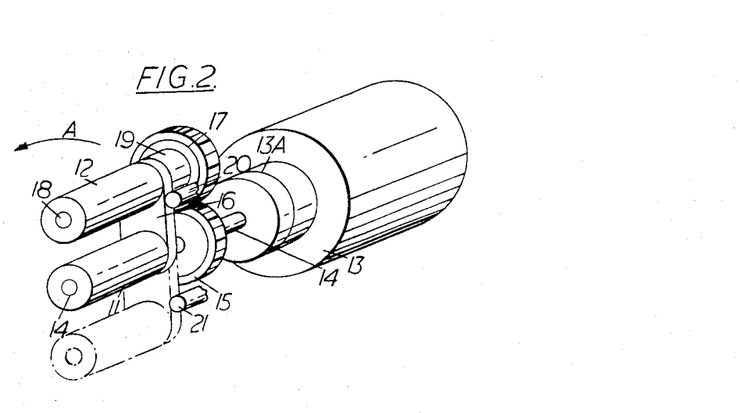
FIG. 2 shows a pictorial view of a capstan unit used in the apparatus of FIG. 1.

In its passage between the tape reels, the tape 1 is arranged to be fed past a pair of capstan units C1 and C2, a pair of photo-electric readers P1 and P2, a tape oscillating unit T1, and a tape feed unit F1. A pictorial view of the capstan unit C1 is shown in FIG. 2, in which the means for driving the rollers 11 and 12 of the unit is constituted by a reversible geared electric motor 13. Between the driving shaft 14 and the motor 13 there is a slipping clutch 13a, and to the driving shaft 14 there is affixed a roller 11 and a gear wheel 15, with a floating arm 16 carried on the same shaft between the roller and the gear-wheel. The second roller 12 and a second gear-wheel 17 (meshing with gear-wheel 15) are affixed to a second shaft 18 which is rotatably carried in a journal bearing (not shown) which extends through an end portion of arm 16. A friction pad 19 is also arranged on shaft 18 between the arm 16 and the gear-wheel 17.

Figure 3:
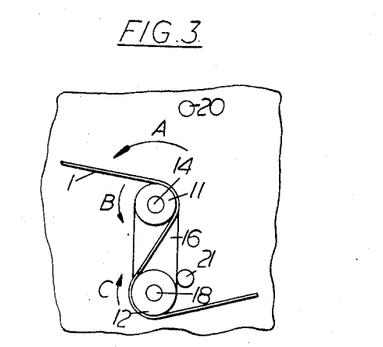
FIG. 3 shows a side view of the capstan unit of FIG. 2 in an operating condition.

In the non-operating condition of the capstan, the arm 16 rests against a stop pin 20 and the tape 1 is arranged to pass between the rollers 11 and 12 as shown in FIG. 1. In the operating position of the capstan the arm 16 rests against the stop pin 21. The arm 16 is carried to this position through rotation of shaft 14 of motor 13, in the direction indicated by the arrow A. In consequence of this movement, the tape 1 is engaged by the rollers 11 and 12, as shown in FIG. 3, and continued rotation of shaft 14 with the captan in the operating condition causes rollers 11 and 12 to rotate in the directions indicated by the arrows B and C, to augment the feeding of tape from reel 3 to reel 2 during reading of a selected section or sections of tape in a manner later to be described. Switching means, also later to be described, is provided and operated by the arm 16 to indicate when the capstan unit is in the operating or non-operating condition and to effect control of other functions of the apparatus. The capstan unit is set to its non-operating condition through rotation of the shaft 14 in a direction reverse to that indicated by the arrow A, whereupon the arm 16 is rotated in the same direction to bring it into engagement with the stop pin 20 and the slipping clutch permits the motor to continue to run and rollers 11 and 12 to continue to rotate. The arrangements of capstan units C1 and C2 are precisely the same, and switching means, later to be described, is provided with both capstan units to effect indication and the control of functions of the apparatus. In capstan unit C2 however, stop pins 20 and 21 of the capstan are disposed to the left of shaft 14 instead of to the right and opposite directions of rotations of shaft 14 bring the capstan into operating and non-operating positions.

The photo-electric readers P1 and P2 each comprise a light source 23, and a photocell 24 disposed respectively above and below the tape 1 which passes between pairs of freely rotating rollers 22 in its passage between the capstans C1 and C2 and the photo-readers. These photo-readers are arranged with respect to the tape, so that a selected one is able to "read" perforations in the eighth channel of perforations extending along the length of the tape, and indicative of a particular section of tape containing a specific item or items of information.

The tape oscillating unit (FIG. 1) comprises a plate 25 which is oscillated about the axis of a pin 26 in the directions indicated by the arrows D and E, under the influence of a cam 27, driven by a motor 50 (FIG. 5a), and a tension spring 28. The plate 25 incorporates a fixed jaw 29 and a jaw 30 which is moved in the direction indicated by the arrow F by the armature 31 of a solenoid 51 when this solenoid is energised. When the solenoid is de-energised the jaw 30 is moved in the direction indicated by the arrow G under the influence of a compression spring 32 disposed between the headed lower end of the armature and the solenoid core.

Figure 4:
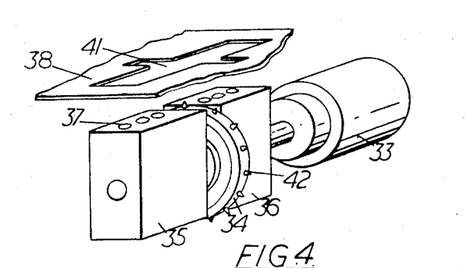
FIG. 4 shows a pictorial view of part of the tape reading apparatus of FIG. 1.

The tape feed unit F1 (FIG. 1) includes a tape feed sprocket-wheel 34 which is driven by means, such as a rotary solenoid which effects step-by-step rotation of the sprocket-wheel in one direction or the other, or which is driven by a reversible geared electric motor 33 (FIGS. 4 and 5a), and which is disposed between the mountings 35 and 36 for a row of peckers, such as 37, of well-known type for a perforated tape reader, as shown in the pictorial view of FIG. 4. In such a reader the six peckers, such as 37, sense different rows of combinations of perforations in six channels of perforations extending the length of the tape and are permitted to move upward in the presence of the perforations thereover to indicate the elements of a character, figure, or symbol which the perforations represent. The driving means 33 is adaptable to drive the sprocket-wheel 34 at any one of a number of selected speeds to effect reading of information from the tape in a manner later to be described or to store information in the tape.

Referring again to FIG. 1, a platform 38, of the tape feed unit F1, is pivoted at one end on a pin 39, and is located above the sprocket-wheel 34 and peckers, such as 37, of the tape reader. The platform 38 is arranged to move about the axis of the pin 39 against the influence of a compression spring 40 disposed between its underside and a portion of the apparatus mounting. A cruciform hole 41 (FIG. 4), in the surface of platform 38, permits the teeth 42 of sprocket-wheel 34, and peckers, such as 37, of the tape reader, to extend through the plate 41 when it is pivoted downward about the axis of the pin 39 against the influence of the compression spring 40. In this pivoting action, the plate 38 is arranged to operate a pair of microswitches M6 and M7 (shown schematically in FIG. 5b) through engagement with their plungers.

Mounted above the platform 38, on the arm 43, there is a plate 44 with a longitudinal slot therealong to clear the teeth 42 of the sprocket-wheel 34. The arm 43 is pivotally mounted on another arm 45 which is in turn pivotally mounted on a pin 46 affixed to the apparatus mounting. A second arm 47 is also pivotally mounted on a pin 48 affixed to the apparatus mounting and engages the end of a plunger 49, and a solenoid S2, which plunger is urged upward to its non-operated position by a compression spring 51. A compression spring 52 is arranged between the arms 45 and 47 to impart consequential movement to arm 45 as a result of movement of arm 47. A third arm 52ᵃ, pivotally mounted on a pin 53 affixed to the apparatus mounting, is arranged at right angles to arms 45 and 47 and has a cammed portion 54 which is arranged, on operation of the tape feed unit to engage the cammed portion 55 of arm 47, and an end portion 56 which engages with the upper surface of the free end of arm 45. The arm 52ᵃ is arranged on movement, to operate a microswitch M1 by way of the plunger 57 of the microswitch.

In now describing the operation of the apparatus, and considering in the first instance that the apparatus is in the rest condition, one half of the tape is disposed to the left of the line Y—Y and the other half is disposed to the right of the line. In this condition of the apparatus, one or the other of the photo-readers P1 and P2 is connected to an electronic counter EC dependent on the position of changeover contacts DSA/1 shown in FIG. 5a, which figure should now be referred to with FIG. 6. To search for a section of information from the tape accommodated on the left hand reel 2, relays DS and DSA (FIG. 5b) are de-energized by the condition of the external "Direction of Search" changeover switch DSW.

Figure 6:
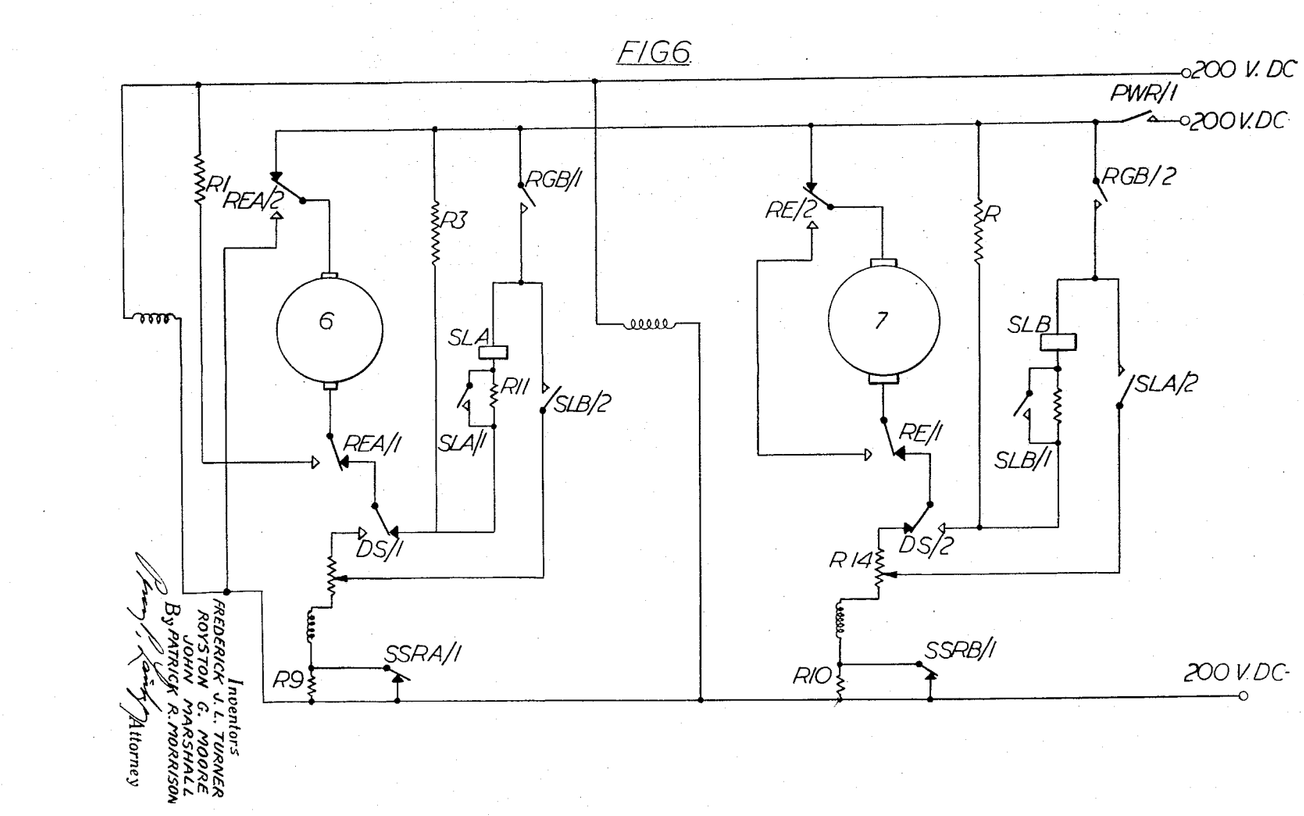
FIGS. 6 to 10 inclusive show the conditions of electrical circuits employed in controlling tape reel motors during various stages of operation of the apparatus.
Figure 7:
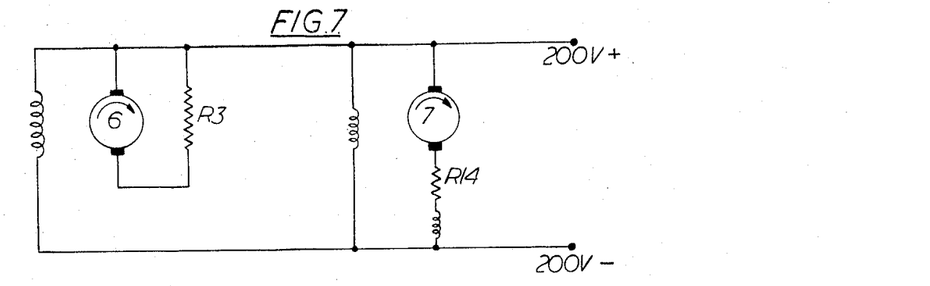

Contacts DS/1 and DS/2 of the relay DS, un-energized (FIG. 7), condition the circuits of the electric motors 6 and 7, such that the armature of motor 7 is connected in series with a current limiting resistor R14 (FIG. 6), and its series field to the 200 volts D.C. supply lines to act as a drive motor for tape reel 3; whilst the armature of motor 6 is short circuited by the resistor R3 to act as a generator to apply a retarding force to reel 2. This condition of operation of the motor is shown in FIG. 7.

Changeover contacts DSA/1 (FIG. 5a) of relay DSA selects the appropriate photo-reader for operation, in this case photo-reader P1 is used.

The apparatus is now prepared to effect a high speed search, in the order of, for example, a tape speed feed of 80 feet per second, for a section of tape on reel 2 by closing the pairs of contacts of the "START" switch. One pair of "START" contacts will cause the electronic counter EC of a well-known type to be re-set to zero. Closure of the other pair of contacts of the "START" switch energizes the "START" relay ST.

The pair of contacts ST/2 prepare a path for the energisation of power relay PWR to operate via pairs of contacts of microswitches M2 and M3 particular to capstan units C1 and C2 respectively.

A 12 volt D.C. supply is connected to the motors C1M and C2M of capstan units C1 and C2 as soon as the main power supply to the apparatus is switched on. The polarity of the supply to motors C1M and C2M is determined by sets of changeover contacts CM1 and CM2, and in this case the polarity is such (through the energised condition of relay CM particular to the sets of changeover contacts) that the motors C1M and C2M drive the capstan units to their non-operated condition. As soon as the arms, such as 16 (FIG. 2), of the capstan units move toward their unoperated positions they move out of engagement with the operating plungers of microswitches M2 and M3, pairs of contacts of which close to complete the circuit from earth to power relay PWR.

Figure 5A:
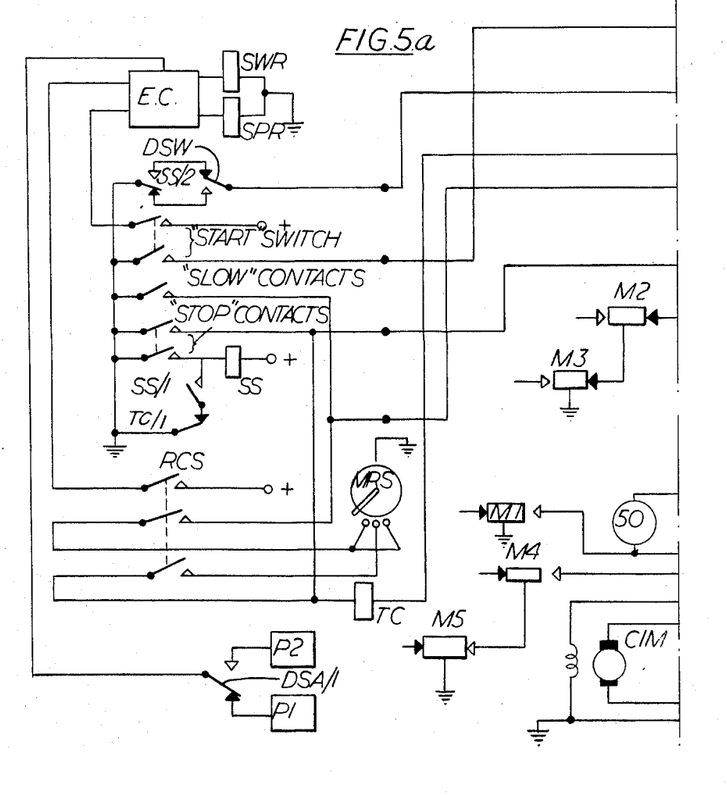
FIGS. 5a and b show an electrical circuit employed in the operation of the apparatus.

The pair of contacts PWR/1 (FIG. 6) on closing through energisation of relay PWR connects the 200 volts D.C. supply to the circuits for motors 6 and 7. The motor 7, connected as a driving motor for reel 3, causes this tape reel to draw tape from the reel 2 carried on the shaft of motor 6 which is now connected as a generator. The value of the resistor R3 shorting the generator armature is such as to produce an adequate winding tension throughout the length of wind but without seriously reducing the acceleration and speed of searching. The passage between the two reels of the eighth channel of perforations indicating successive sections of the tape causes electrical pulses to be developed by the selected photo-reader, in this case, P1 (FIG. 1). These pulses are fed to the electronic counter EC which is preset to operate a "slow" relay SWR (FIG. 5a) at a predetermined first count. Operation of relay SWR causes closure of the pair of "SLOW" contacts (FIG. 5).

Figure 5B:
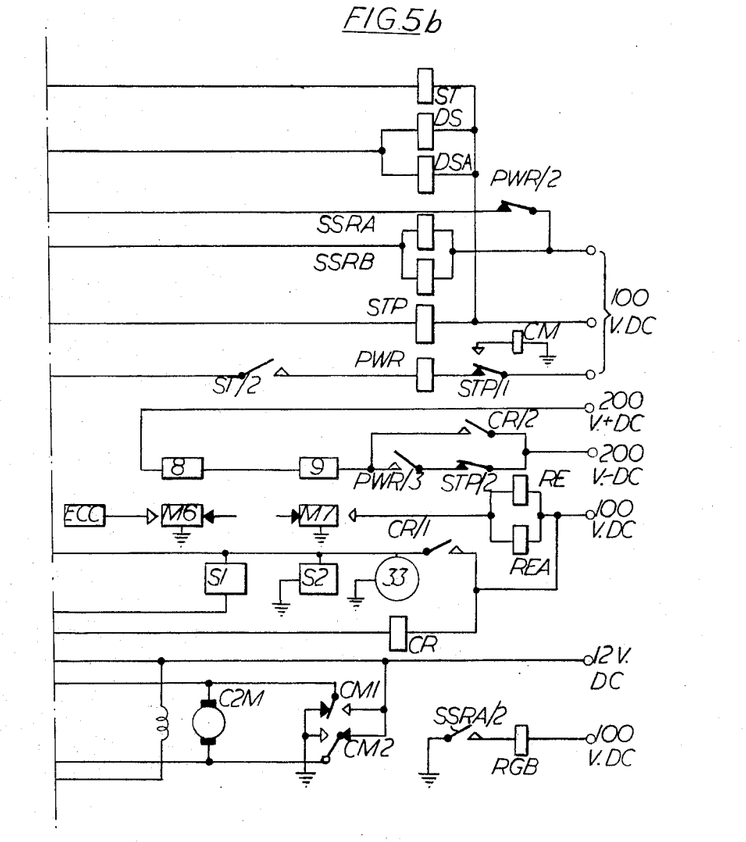
Figure 8:
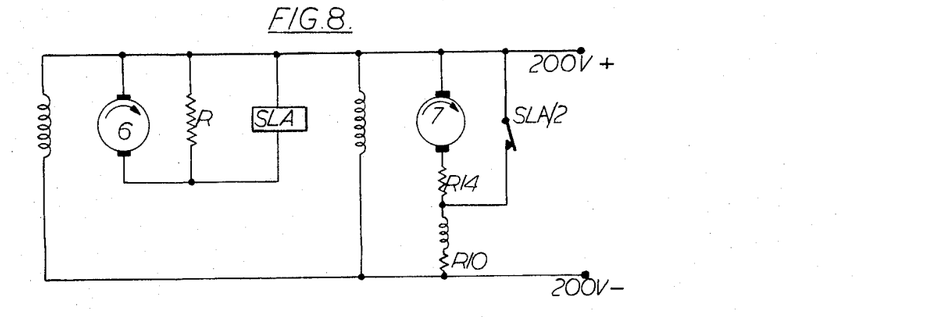
Figure 9:
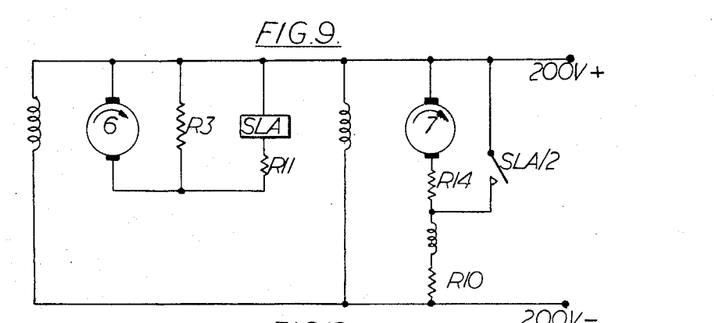

The result of closing the pair of "SLOW" contacts is to reduce the speed of the tape to such a value (approx. 5 ft./sec.) so that on application of the electro-magnetic brakes 8 and 9 (FIGS. 1 and 5b), which occurs when the pairs of "STOP" contacts are closed, the momentum of the rotating parts is sufficiently low to enable the tape with the selected section of information to be brought to rest in close proximity to the tape reading head in the tape feed unit F1. The pair of "SLOW CONTACTS" on closure, energise the "SLOW SPEED" relays SSRA and SSRB (FIG. 5). Energisation of relay SSRB causes contacts SSRB/1 (FIG. 6) to break so as to insert a resistor R10 in series with the armature and series field of motor 7, and energisation of relay SSRA causes closure of the pair of contacts SSPA/2 (FIG. 5b) of that relay to energise relay RGB. Energisation of relay RGB causes closure of the pair of contacts RGB/1 (FIG. 6) to connect relay SLA in parallel with the resistor R3 thus shorting the armature of motor 6 acting as a generator. Relay SLA which is a current sensitive relay is designed to operate at a current above 3 amperes, and to de-operate when the current falls below 2 amperes. On energisation, the current flowing through relay SLA and its series resistor R11 causes the relay SLA to operate, and the pair of contacts SLA/1 on closing shorts out the series resistor R11. The resistance of relay SLA is very low compared with that of the shorting resistor already in circuit, and the effect of this low resistance is to greatly increase the braking effect of the motor 6 acting as a generator. Simultaneously with the closing of the pair of contacts SLA/1, the pair of contacts SLA/2 imposes a short circuit around the armature of the motor 7. The magnitude of this short circuit is adjusted by the series resistor R14 to produce the same value of short circuit current in the driving motor 7 as in the motor 6 acting as the generator. As the rotational speed of the reels 2 and 3 is quickly reduced due to the braking action of the motors 6 and 7, this equality of short circuit current ensures that the tape tension between the reels will be maintained, since the rate of deceleration of the reel 6 is always greater than that of the reel 7 for the same retarding force. This is because of the inequality of distribution of tape on the two reels, amounts of which were equal at the commencement of the high speed search, but the amount is now greater on the reel 3. This condition of the circuitry for motors 6 and 7 is shown in FIG. 8.

Figure 10:
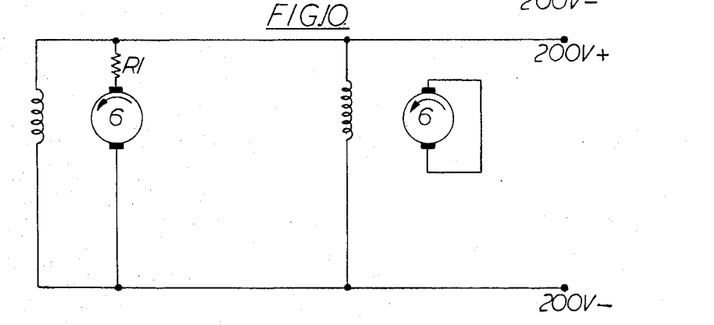

When the short circuit current of the motor 6 acting as a generator falls below 2 amps (this occurs at a tape speed of approximately 5 ft. per sec.), relay SLA de-operates and the pair of contacts SLA/2 open to remove the short circuit around the armature of motor 7. The motor 7 continues to run at slow speed due to the presence of resistor R10. The pair of contacts SLA/1 also open to remove the short circuit around resistor R11 which limits the short circuit current of the motor 6 acting as a generator and reduces the tension on the tape to a safe value. This condition of the circuitry of motors 6 and 7 is shown in FIG. 10.

The passage of perforations of the eighth channel of perforations in the tape past the photo-reader P1 (FIGS. 1 and 5a) at a speed of approximately 5 ft./sec. continues to cause electrical pulses to be fed to the electronic counter EC. When the predetermined second count, corresponding to the selected section of information is reached, "Stop" relay SPR is energised, and both the pairs of "STOP CONTACTS" of this relay (FIG. 6) close. One pair of the "STOP" contacts operates relay STP to open the pair of contacts STP/2 and cut off the power supply to the electro-magnetic brakes 8 and 9 (FIGS. 1 and 5b) which brakes are in a de-operated condition when energised. The brakes will therefore be applied and bring the reels to rest in a matter of milliseconds, representing an inch or two of tape travel which distance is sufficient, when the tape is brought to rest, to bring the start of the required section for reading to the right of the tape reader peckers, such as 37 (FIG. 4), since reading of information from the required section takes place in a direction reverse to the direction in which searching takes place. The changeover contacts STP/1 of relay STP will, on changing over cut off the power supply to relay PWR and connect the power supply to relay CM. Relay PWR will in consequence be de-energised and the pair of contacts PWR/1 (FIG. 7) open to cut off the power supply to the armature and series field circuits of the motors 6 and 7. Relay CM is energised as a result of changing over of changeover contacts STP/1, and sets of changeover contacts CM1 and CM2 of relay CM change over to reverse the polarity of the supply to the capstan motors. This action causes the capstan units C1 and C2 (FIGS. 1, 2 and 5a and b) to be brought into their operating position as shown in FIG. 3 i.e. the condition for tape reading, whereupon the capstan unit engages the tape and augments the tape feeding operation. This condition is indicated by the operation of microswitches M4 and M5, which switches through engagement of arms, such as 16, of the capstan units with their operating plungers cause pairs of contacts therein to make and apply earth potential to relay CR. The rollers of capstan C2, in their operating condition, rotate in the opposite direction to the rollers of capstan C1, so that the tape, engaged by the rollers when reel 2 takes up slack, is tended to be fed away from reel 2. Rollers of capstan C2 therefore act as snubbers to relieve the tension on the tape at the reading positions.

Closure of the pair of contacts CR/2 through the operation of relay CR re-applies power to magnetic brakes 8 and 9 to remove their braking effect on motors 6 and 7, thus allowing freedom of rotation of reels 2 and 3 during oscillation of the tape between plates 38 and 44 of the tape feed unit F1 which is to follow. Closure of the pair of contacts CR/1 of relay CR applies power to the solenoid S2 of the tape feed unit F1 and to the driving means 33 for the sprocket-wheel 34 of the same unit (FIG. 4), and to the solenoid S1 and to motor 50 driving the cam 27 of the tape oscillating unit (FIG. 1). As a result of energisation of solenoid S1, the jaw 30 (FIG. 1) is carried in the direction indicated by the arrow F by the armature 31 of the solenoid to cause grippage of tape between the jaw 30 and the fixed jaw 29. Motor 50 drives cam 27 to cause oscillation of the plate 25 in the directions indicated by the arrows D and E and consequential oscillation of the tape either side of the gripped portion, one portion of which is between plates 38 and 44 of the tape feed unit F1. The amount through which the tape is oscillated is slightly in excess of the distance between two adjacent feed holes therein, and in its oscillation and in cooperation with plate 44 of tape feed unit, a perforation in the tape will seek a tooth such as 42 in the sprocket-wheel 34.

The application of power to solenoid S2 causes the plate 44 to move downward by the pivoting actions of arms 45 and 47 about the axis of the pins 46 and 48, and against the influence of compression spring 52 disposed therebetween, to cause the tape 1 to be lightly gripped between the plate 44 and plate 38 yet still permitting the tape to be oscillated between the plates. The force in compression spring 52, between arms 45 and 47, is such that if a feed hole in the tape 1 is not in alignment with a tooth, such as 42 on the sprocket-wheel 34, the resistance of the tape prevents further downward movement of plate 44 and further pivoting of plate 38. When, during oscillation, a feed hole in the tape 1 moves into alignment with a tooth of the sprocket-wheel, the plate 44 is permitted to move further downward, and plate 38 is permitted to pivot about the axis of pin 39, since the tooth of the sprocket-wheel engages in the feed hole. In consequence of this further movement, arm 52ª is permitted to pivot in an anti-clockwise direction about the axis of pin 53 under the action of the spring loaded plunger 57 of the microswitch M1, contacts of which then open.

The other pair of "STOP" contacts, closing simultaneously with the aforementioned pair, operates external control relay SS, and the pair of contacts SS/1 of relay SS closing in consequence will lock-up relay SS. The changing over of contacts SS/2 will cause relays DS and DSA to operate or de-operate depending on the original selection of the direction of search.

In the present direction of movement of the tape i.e. the tape being drawn from reel 2 to reel 3, relays DS and DSA will be unoperated, but changeover of contacts SS/2 will effect energisation of relays DS and DSA.

The opposite condition resulting from the changing over of contacts SS/2 and energisation of relays DS and DSA, will cause motor 6, associated with relay SLA (FIG. 7), to act as the motor and motor 7, associated with relay SLB, to become the generator. This arrangement prepares the apparatus for reading of information from the selected section or sections and for return of the tape to the centre position after the information has been read.

When the sprocket holes have become engaged with the sprocket-wheel teeth, microswitches M6 and M7 (FIG. 5b) will be operated under the action of the plate 44 (FIG. 1), engaging with operating plungers of these microswitches, in its pivoting movement. The closure of the contacts of microswitch M6 will indicate to external control circuits ECC that the tape reader may now be operated to read the information. At this stage of operation the commencement of the selected section or sections to be read will be, as already stated, to the right of the tape reader peckers, and thus on movement of the tape 1 in a direction reverse to the direction in which it was moved during searching, the selected section or sections will be read by the peckers, such as 37 (FIG. 4), of the tape reader. Motor 6 has now been conditioned to act as a driving motor for reel 2 and motor 7 has been conditioned to act as a brake for reel 3. The making of the contacts of microswitch M7 operated by plate 38 will cause relays RE and REA (FIG. 5b) to be energised. The changeover contacts REA/1 and REA/2 of relay REA, in changing over, disconnect the armature of the motor 6 (FIG. 1) from the series field and connect it via resistor R1 (FIG. 6) directly to 200 volts D.C. This motor will now act as a driving motor with just sufficient power to take up the slack tape produced by movement of the tape through the reader. Pairs of contacts RE/1 and RE/2 changing over, disconnect the armature of the motor 7 from the series field and power supply and short circuit the armature. This motor now acts as a generator and also acts as a brake to resist the action of the capstan unit C2 which draws tape from reel 3 during the tape reading operation.

In these conditions of operation of the motors (shown in FIG. 10) and capstan unit, it is ensured that an accumulation of slack tape between reels does not occur during the reading of information from the selected section or sections. This prevents tape snatch and possible breakage of the tape when motor 6 is accelerated to return the tape halves to their correct dispositions on their reels.

When the information has been read from the selected section or sections, the halves of the tape are re-accommodated on their respective reels by closing the pairs of contacts of the external "RETURN TO CENTRE" switch RCS (FIG. 5a).

One of these pairs of contacts on closure will reset the electronic counter EC to zero and in doing so de-energise the relays SWR and SPR. One pair of "STOP" contacts of relay SPR on opening will disconnect the operating path of the relay SS. This relay is now held operated by pairs of contacts SS/1 and TC/1. The other pair of "STOP" contacts of relay SPR on opening will de-energise relay STP, to effect changing over of changeover contacts STP/1 to prepare relay PWR for energisation and to effect de-energisation of relay CM. De-energisation of relay CM, effects changeover of the pairs of changeover contacts CM1 and CM2 particular thereto and reverses the polarity of the supply to capstan motors C1M and C2M of capstan units C1 and C2 (FIG. 1) respectively. The rollers 12 of the capstan units then proceed to move to their non-operating positions and the arms 16 (FIG. 2) thereof move away from the plungers of the microswitches M4 and M5 particular to capstan units C1 and C2 respectively; these microswitches are de-operated to de-energise relay CR whose pair of contacts CR/1 then open to cut-off the supply to motor 33 and solenoid S2 of tape feed unit F1, and to motor 50 and solenoid S1 of the tape oscillating unit. The latter mentioned motor and solenoid are already disconnected from earth potential by operation of microswitch M1 under the action of arm 52ª on movement of plate 44, of the tape feed unit F1, downward to engage the tape 1 between itself and the plate 38. Opening of contacts CR/1 therefore cause the tape feed unit F1 (FIG. 1) to revert to its non-operating condition with the tape 1 no longer held between the plates 38 and 44 and disengaged from teeth, such as 42, in the sprocket-wheel 34 the driving motor of which is now stationary. The upward movement of plate 38 of the tape feed unit F1 through de-energisation of solenoid S2 causes the plate 38 to move out of engagement with the operating plungers of microswitches M6 and M7. In consequence of the de-operation of microswitch M6, indication is made to external control circuits ECC that the reading operation is completed, and de-operation of microswitch M7 effects the de-energisation of relays RE and REA.

The contacts RE/1, RE/2, REA/1 and REA/2 of relays RE and REA on changing over will revert the circuits of motors 6 and 7 from the reading condition shown in FIG. 11 to the searching condition shown in FIG. 8 with the exception that the direction of search is reversed owing to the previous changeover of relay contacts DS/1 and DS/2. Contacts CR/2 of relay CR on opening will de-energise the reel brakes 8 and 9, and contacts STP/2 closing will prepare the path for re-energising the reel brakes via contact PWR/3 when closed. The "SLOW" contacts opening through de-energisation of relay SWR, de-energise relays SSRA and SSRB, and contacts SSRA/2 of relay SSRA, on opening, de-energise relay RGB. Pairs of contacts RGB/1 and RGB/2 (FIG. 6), in consequence, open and disconnect the current sensitive relays SLA and SLB from the circuits of motors 6 and 7 respectively. Sets of contacts SSRA/1 and SSRB/1 on changing over will short circuit the resistors R9 and R10.

When the rollers, such as 12, of the capstan units C1 and C2 reach their non-operating positions, the arms, such as 16 (FIGS. 2 and 3), thereof engage the plungers of the microswitches M2 and M3 and operate them to energise relay PWR to cause closure of the pair contacts PWR/3 (FIG. 5) and PWR/1 (FIG. 6) so as to respectively energise electro-magnetic brakes 8 and 9 which in the energised condition remove their effect from the reels 2 and 3, and to supply power to the armature and series field circuits of motors 6 and 7. Motor 6 in consequence is accelerated to drive reel 2 to draw tape from reel 3, and motor 7 acts as a generator, the retarding action of which maintains tension in the tape during return of the tape to a position where the two halves are accommodated on their respective reels. This condition of the disposition of the halves of the tape is given by a mechanical rotary switch MRS. This switch has three fixed contacts which are swept by a rotating contact, geared to one of the motor spindles. The two outer fixed contacts are joined together and connected to the one of the pair of "SLOW" contacts via a pair of contacts of the "RETURN TO CENTRE" switch RCS. The centre fixed contact is connected to one of the pairs of "STOP" contacts and to one side of a "TAPE AT CENTRE" relay TC and another set of contacts of the "RETURN TO CENTRE" switch RCS. The rotating contact of the switch is connected to earth. As the tape approaches the centre position (within approximately 80 ft. of tape) the rotating contact will, through design of the gear ratios, make with one of the outer fixed conacts depending on the original direction of search. This will apply earth potential to relays SSRA and SSRB through the line therebetween.

The rotating contact is designed to maintain connection with the outer fixed contact during the transit between this contact and the centre fixed contact, and when the tape has reached the centre position the rotating contact will make with the centre fixed contact and apply earth potential to the one side of one of the pairs of "STOP" contacts and to the "TAPE AT CENTRE" relay TC, as a consequence, relays STP and TC will be energised.

The energisation of relays, SSRA, SSRB and STP will cause the driving motor 6 and the motor 7 acting as a generator to slow down and stop in the same manner as described for searching. The opening of contacts ST/2 will de-energise relay PWR and closure of contacts PWR/2 will connect 100 volts D.C. to the external "TAPE AT CENTRE" relay TC.

This relay in operating will cause the external control circuits to open the contacts of the "START" switch, contacts of the "DIRECTION OF SEARCH" switch (if operated, and open the "RETURN TO CENTRE" contacts RCS.

The apparatus is thus returned to the rest condition in preparation for a subsequent search which may be for a section or sections of tape accommodated on the reel 3. It will be understood that reversal of the functions of motors 6 and 7 for the various stages of searching and reading for a section or sections of tape from reel 3 will be effected by the use of the "DIRECTION OF SEARCH" switch which will condition the apparatus for this particular mode of operation and driving means 33 (FIG. 4) driving sprocket-wheel 34 will be conditioned, through the use of extra sets of changeover contacts (not shown) of the "DIRECTION OF SEARCH" to feed tape in a reverse direction, when reading of a section or sections of tape is to be effected in this mode of operation.

It will be readily understood that manually operated switching arrrangements may be incorporated in the circuits of the apparatus to effect those functions now performed automatically.

The apparatus is adaptable for use with a variety of tape readers, and is especially adaptable for use with magnetic tape. If magnetic tape is used, then the tape feed unit F1 and the tape oscillating unit T1 may be dispensed with. The photo-readers P1 and P2 would be replaced by magnetic reading heads which would be responsive to signals indicative of the sections of information on the tape and which signals would be recorded into a separate track running parallel with one or more tracks of information. Each track of information would be assigned to its own particular reading head, which would be located in a position occupied in the described embodiment by the perforated tape reader peckers. The capstan units, which alone would be sufficient to effect feeding of the tape at reading speed past the reading head or heads could be augmented by pairs of rollers disposed either side of the position occupied by the reading head or reading heads and arranged so that one roller of each pair is brought into engagement with the tape at the appropriate time to augment tape feeding during the reading period.

A modification of the apparatus could be effected by dispensing with the tape reader of the tape feed unit F1 and replacing it with tape perforating apparatus so that information can be "written" into a selected section of blank tape in the form of perforations. The other items of equipment and their functions would remain as described. If it is so desired, both a tape reader and tape perforator could be included with switching means operable to select one or the other by operation.

What we claim is:

1. Tape information storage apparatus comprising first means for feeding from one tape reel to another at a high speed and at a reduced speed, tape having a plurality of sections and including feed perforations, the said first means including a pair of electric motors each of which carries on the shaft thereof one of said tape reels and either of which said motors is operative to drive its reel to draw tape from the other reel, the motor of the non-driving reel being operative to apply a retarding force to said non-driving reel during withdrawal of the tape therefrom, second means for feeding the tape in a reverse direction at a selected one of a number of speeds and including a sprocket-wheel for engaging the tape feed perforations to thereby drive the tape at the selected one of the said number of speeds, settable means for detecting a selected one of said sections and a section prior to said selected section as said tape moves between said reels, oscillating means operative upon detection of the said selected section by the detecting means to oscillate the tape longitudinally thereof in the region of said sprocket-wheel to cause a perforation therein to seek a tooth in said sprocket-wheel to permit engagement therebetween, means including braking means operative on detection of said prior section by said detecting means to cause said first feeding means to shift from high speed to said reduced speed and including braking means operative on detection of said selected section to cause said first feeding means to stop feeding and said second means to feed the tape in the reverse direction at the selected one of said number of speeds to permit information to be stored in or withdrawn from the selected section of tape.

2. Tape storage apparatus, as claimed in claim 1, in which said first feeding means includes means for causing operation of said first feeding means for feeding said tape in the said reverse direction at high speed responsive to termination of storage of information in or withdrawal of information from said selected section; and in which means is provided for causing said braking means to stop said first means from feeding said tape in the said reverse direction at high speed when equal amounts of tape are accommodated on the said reels.

3. Tape information storage apparatus, as claimed in claim 2, in which said first feeding means includes means for maintaining tension in the tape disposed between the two reels during feeding therebetween.

4. Tape information storage apparatus, as claimed in claim 3, including capstan means operative on detection of the said selected section to engage the tape between the reels, to assist in maintaining tension in the tape between the reels and to augment the said feeding means in the function of feeding the tape in the reverse direction at the selected one of the said number of speeds.

5. Tape information storage apparatus, as claimed in claim 4, in which the said means for detecting said prior section and said selected section of tape comprises a photo-electric device for producing pulses representative of the number of sections of the tape fed past the device, and a counting device for controlling the functions of the said first and second feeding means and capstan means in accordance with the number of pulses counted, each of the said sections being identified by a perforation therethrough which is detectable by said photo-electric device.

6. Tape information storage apparatus, as claimed in claim 5, including a tape reader operative, when the tape is being fed at the selected one of the said number of speeds in the reverse direction, to read information from the selected section of tape in the form of perforations therethrough.

7. Tape information storage apparatus comprising spaced parallel shafts for supporting two tape reels having portions of a length of tape wound on each, said tape having a plurality of sections, separate means operatively connected to each shaft for selectively driving the shaft in either direction at a high speed or at a low speed, means operatively connected with one of said shafts for controlling both said driving means for normally maintaining equal amounts of tape on said reels, settable counting means adapted to be set for a selected section of said tape on either one of said reels, starting means connected to said settable counting means and to said driving means for causing said driving means connected to the shaft for said other reel to rotate said other reel so as to draw said tape at high speed from said one reel, detecting means electrically connected to said settable counting means and mounted between said reels adjacent the tape and adapted to deliver a signal to said settable counting means as each section passes said detecting means, said settable counting means being responsive to said signals, means controlled by said settable counting means for shifting the speed of said driving means for said other reel to low speed before the selected section arrives at a predetermined position, means also controlled by said settable counting means for stopping said driving means and said reels when the selected section has reached said predetermined position with respect to said detecting means, normally inoperative transducing means mounted between said reels adjacent said tape, additional tape driving means adapted to engage said tape between said reels and drive it selectively in either direction at a selected one of a number of speeds, and means controlled by said settable counting means for causing said additional tape driving means to drive said tape at a selected one of said number of speeds past said transducing means and for simultaneously enabling said transducing means.

References Cited by the Examiner

UNITED STATES PATENTS

| | | | |
|---|---|---|---|
| 2,631,855 | 3/1953 | Kornei | 179—100.25 X |
| 2,667,613 | 1/1954 | Trevitt | 318—305 |
| 2,683,568 | 7/1954 | Linsay. | |
| 2,703,714 | 3/1955 | Demby et al. | 179—100.25 X |
| 2,834,928 | 5/1958 | Carter | 318—162 X |
| 2,854,856 | 10/1958 | Oppen | 318—162 X |
| 3,029,316 | 4/1962 | Fine. | |
| 3,115,289 | 12/1963 | Namenyi-Katz | 179—100.25 X |

ORIS L. RADER, *Primary Examiner.*